United States Patent [19]

Murakami et al.

[11] Patent Number: 4,989,444
[45] Date of Patent: Feb. 5, 1991

[54] INDUSTRIAL ROBOT FOR PRESSING SYSTEM, PRESSING SYSTEM, AND METHOD FOR BENDING PLATE MATERIAL

[75] Inventors: Manabu Murakami, Settsu; Masanori Yamashita, Suita; Tadafumi Mikoshi, Osaka; Akihiko Fujii, Sakai, all of Japan

[73] Assignee: Daikin Industries, Ltd., Osaka, Japan

[21] Appl. No.: 390,827

[22] Filed: Aug. 8, 1989

[30] Foreign Application Priority Data

| Aug. 9, 1988 | [JP] | Japan | 63-198156 |
| Aug. 9, 1988 | [JP] | Japan | 63-198157 |
| Oct. 3, 1988 | [JP] | Japan | 63-129910[U] |

[51] Int. Cl.$^5$ ............... B21D 43/00; B21J 13/10; B25J 15/06
[52] U.S. Cl. ............... 72/422; 72/419; 414/735; 901/40
[58] Field of Search ............... 72/386, 389, 420, 422, 72/461, 419; 414/759, 772, 776, 735, 737; 901/1, 16, 40; 83/440.1

[56] References Cited

U.S. PATENT DOCUMENTS

| 3,010,587 | 11/1961 | Hollinger | 901/40 |
| 4,552,502 | 11/1985 | Harjar | 414/735 |
| 4,555,217 | 11/1985 | Wright | 414/735 |
| 4,611,846 | 9/1986 | Feiber et al. | 901/40 |

FOREIGN PATENT DOCUMENTS

| 125189 | 11/1984 | European Pat. Off. | |
| 2202235 | 7/1973 | Fed. Rep. of Germany | 72/422 |
| 3407445 | 9/1985 | Fed. Rep. of Germany | 72/420 |
| 2310196 | 12/1976 | France | 72/420 |
| 2440233 | 5/1980 | France | |
| 2584634 | 1/1987 | France | |
| 37034 | 11/1975 | Japan | 72/389 |
| 100825 | 8/1980 | Japan | 72/389 |
| 912617 | 3/1982 | U.S.S.R. | 72/422 |
| 919804 | 4/1982 | U.S.S.R. | 72/422 |
| 1024139 | 6/1983 | U.S.S.R. | 72/419 |
| 1535136 | 12/1978 | United Kingdom | |

OTHER PUBLICATIONS

*Machine Design*, pub. Nov. 27, 1975, vol. 47, No. 28; pp. 54-59, "Let The Robot Do It" by Robert B. Aronson.
European Patent Application, pub. Nov. 3, 1987; No. 0213,667, Inventor: Cornelis H. Liet.
European Patent Application No. 0300984, pub. Jan. 1989; Inventor: Antonio Codatto.

*Primary Examiner*—Robert L. Spruill
*Attorney, Agent, or Firm*—Beveridge, DeGrandi & Weilacher

[57] ABSTRACT

An industrial robot, designed for use in a press brake system, has a holding member for holding a plate shaped material, a base arm, and a working arm. The holding member nearly follows the plate shaped material without holding during a pressing process of the press brake by ensuring sufficient reciprocating distance between the holding member and the base arm, and by decreasing the mass of rotary axes and corresponding second arm members of the working arm which is used to control direction, altitude and other aspects of the plate shaped material. The industrial robot preferably ensures a degree of freedom in the width direction of the press brake by rotatably securing a first arm member to the base arm.

16 Claims, 13 Drawing Sheets

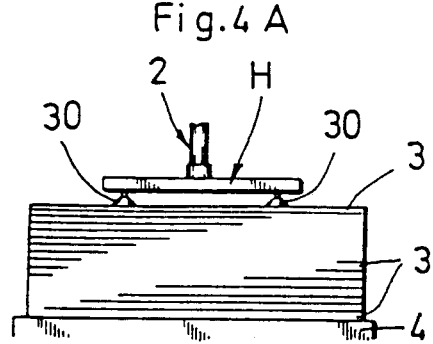
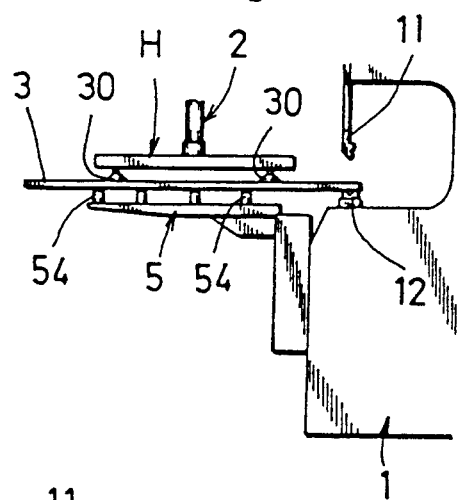
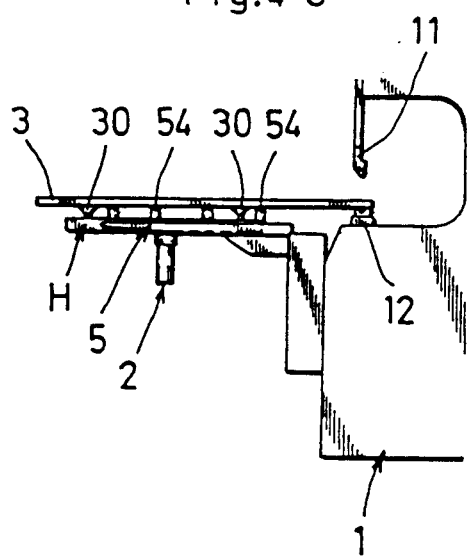

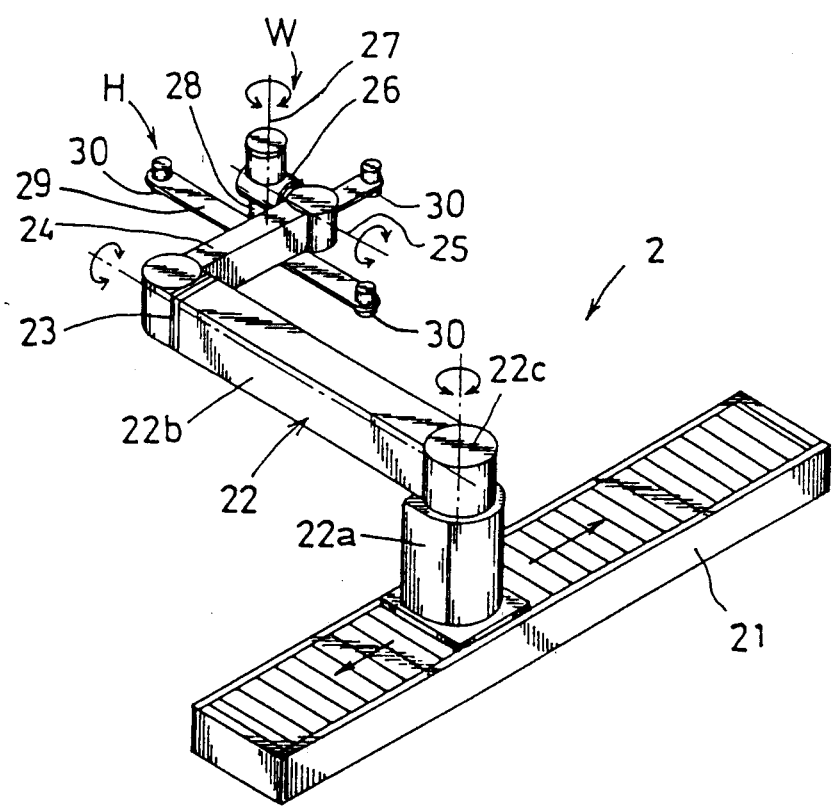

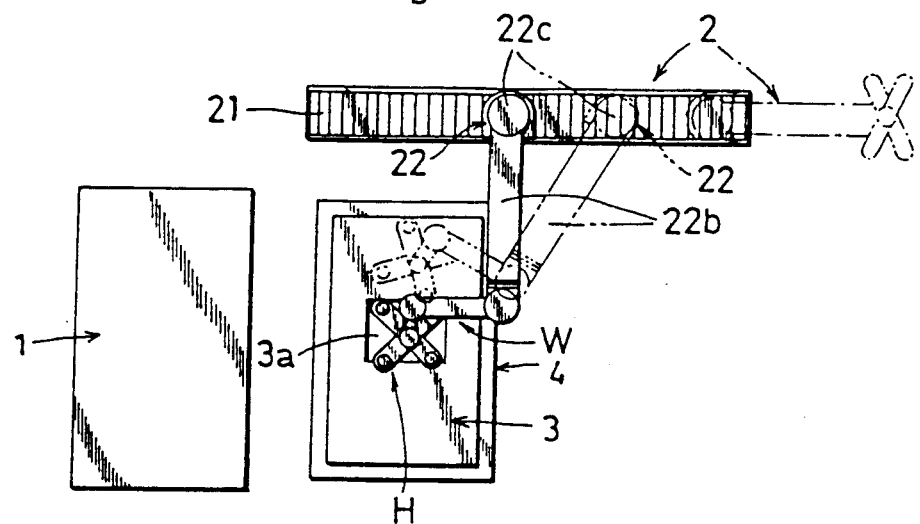
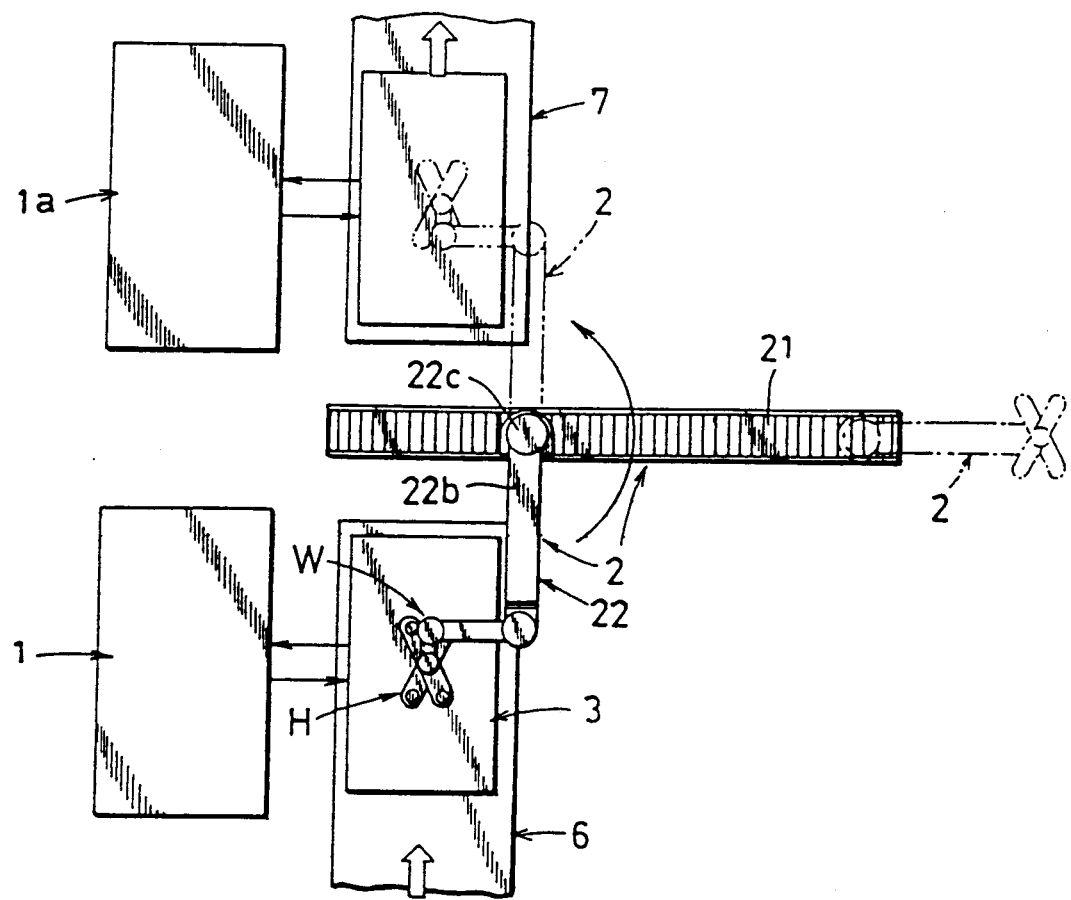

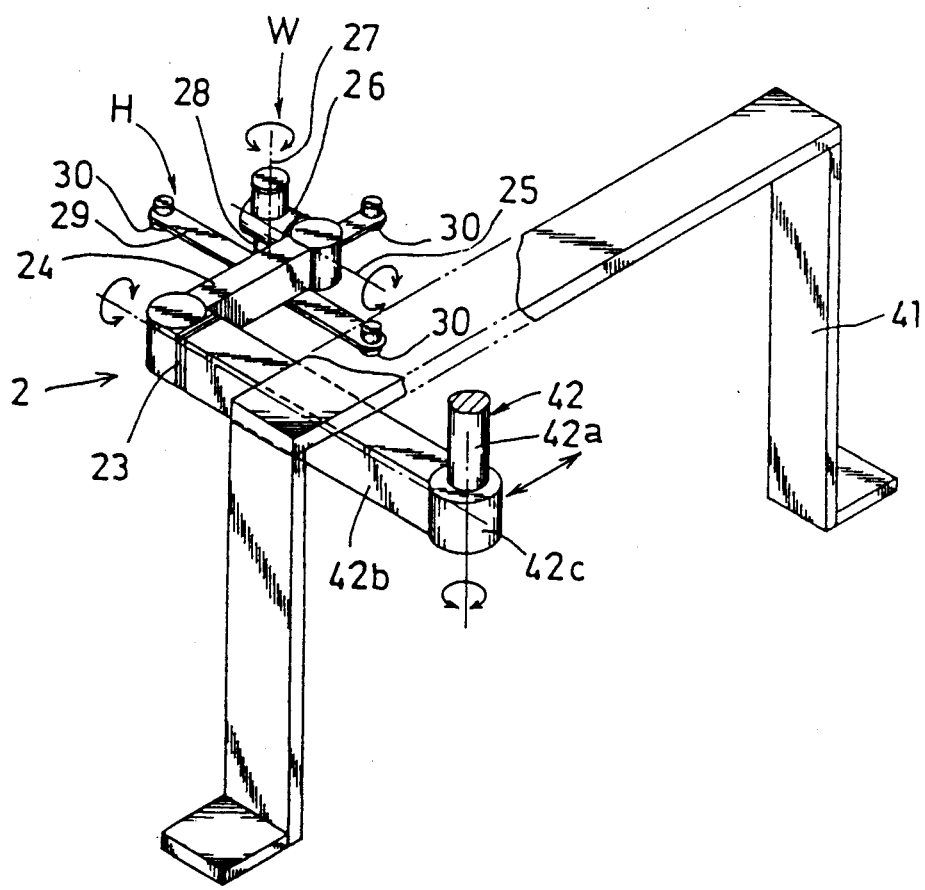

INDUSTRIAL ROBOT FOR PRESSING SYSTEM, PRESSING SYSTEM, AND METHOD FOR BENDING PLATE MATERIAL

BACKGROUND OF THE INVENTION

The present invention relates to an industrial robot designed for use in a pressing system, a pressing system, and a method of bending plate shaped material. More particularly, the invention relates to an industrial robot, a pressing system, and a method for carrying a plate shaped material, for bending the material with a press brake, and for carrying the bent material out of the press brake.

Press brakes are traditionally used for bending plate shaped material at a predetermined position and a predetermined angle. Industrial robots are also traditionally used for carrying plate shaped material in and out of the press brakes. (Japanese Pat. Laid Open No. Sho 59-175968)

The industrial robot shown in FIG. 17 has a horizontal rotary axis 103 at an upper portion of a supporting base 102. The horizontal rotary axis 103 coincides with a longer axis 101 of an upper die of the press brake. A horizontal rotary axis 105 is fixed to a leading edge portion of a squarely moving arm 104 elongated at a right angle from the horizontal rotary axis 103. A horizontal rotary axis 107 is fixed to a leading edge portion of a squarely moving arm 106 elongated at right angle from the horizontal rotary axis 105. The horizontal rotary axis 107 is the half the length of the upper die. A vertical rotary axis 108 is fixed to a leading edge portion of the horizontal rotary axis 107. A holding member 109, having plural attracting heads 110 for holding the plate shaped material, is fixed to a leading edge portion of the vertical rotary axis 108. The holding member 109 follows the plate shaped material 112 by movement of the horizontal rotary axis 103 when the material 112 is bent by raising a lower die 111 of the press brake.

In the press brake system described earlier, the holding member 109 is moved to the top surface of the piled plural material 112 by moving the horizontal rotary axes 103, 105 and 107. In this situation, the uppermost material 112 is attracted by the plural attracting heads 110 of the holding member 109. Then, the attracted material 112 is contacted with the top surface of the lower die 111 by keeping the attracting state and by again moving the horizontal rotary axes 103, 105 and 107. The lower die 111 is raised and the upper die 113 and the raised lower die 111 nip the material 112. When the material 112 is bent in the manner described above, the holding member 109 keeps hold of the material 112. Following the bending operation, the holding member 109 follows the material 112 by controlling and rotating a single axis, namely the horizontal rotary axis 103. After the bending operation is finished, the material 112 is carried to a disposing position by lowering the lower die 111 and moving the horizontal rotary axes 103, 105 and 107.

As is apparent from the foregoing, the material 112 is kept attracted by the attracting heads 110 of the holding member 109 not only when the material 112 is carried in and out of the press brake but also when the material 112 is being bent. As a result, it seems possible that shifting of the material 112 is avoided. The shifting is due to shifting of the attracting start timing to changing timing of these and other operations. Thus, the bending operation is achieved with higher precision.

The industrial robot, having the arrangement described earlier, is manufactured with the recognition that attracting the material 112 is needed not only when the material 112 is carried in and out of the press brake but also when the material 112 is being bent. It is also manufactured on the assumption that the holding member 109 follows the material 112 during bending by controlling and rotating only the horizontal rotary axis 103. In practice, it is almost impossible for the holding member 109 to perfectly follow the material 112 because the mass of the portion driven by the horizontal rotary axis 103 is extremely great. As a result, bending force is applied to the material 112. The bending force is generated by the imperfect following of the holding member 109 when the pressing processing speed of the press brake is not varied at all. This has the disadvantage of lowering the precision of the finished products. On the contrary, the holding member 109 perfectly follows the material 112 by lowering the pressing processing speed of the press brake. This inevitably gives rise to the disadvantage that the processing speed of the press brake is lowered by employing the industrial robot. More particularly, the press brake can control the bending angle by nipping the material 112 with the upper die 113 and the lower die 111 and controlling the degree of nipping. Accordingly, the nipping speed is generally kept at a constant speed. But the portion of the material 112 attached by the attracting heads 110 of the holding member 109 moves at the speed corresponding to the trigonometrical function value determined by the bending angle. The moving rate of the holding member 109 is not kept constant but is varied in correspondence with the bending angle from beginning of the bending operation to finishing of the bending operation. As a result, imperfect following of the holding member 109 is obtained under the ordinary pressing speed of the press brake because it is affected by the mass of the portion driven by the horizontal rotary axis 103. Imperfect following of the holding member 109 is also obtained because the locus of bending is not constant due to a tolerance of thickness of the material 112.

Further, a moving extent of the holding member 109 can not be determined because movability, responsibility, and physical strength of the industrial robot are greatly influenced when the moment of inertia and the like of arm members is increased too much based on increment of arm driving radius. Thus, peripheral devices for transporting plate shaped material 112 to the limit position of the holding member 109, and peripheral devices for transporting plate shaped material 112 from the limit position of the holding member 109 to the piling up position and the like are additionally required. The press brake is disadvantageously large-sized as a whole and complicated in its hardware construction and its interrelated control of each device and others.

Furthermore, as apparent from FIG. 17, the industrial robot has no degree of freedom of the holding member 109 in a width direction of the press brake. This gives rise to the disadvantage that, when the material 112 has holes at the central portion thereof, imperfect attracting of the plate shaped material 112 results due to opposition of the attracting heads 110 to the holes in the material 112.

Further, the direction of carrying the material 112 in the press brake with the industrial robot is previously determined as the front side of the press brake. Additional devices for transporting the material 112 between plural press brakes are required, thereby complicating the construction of an automated line. Also, two species of industrial robots are needed in the event that the disposition of the industrial robot relative to the press brake is on the opposite side relative to the disposition of the press brake, the disposition with other peripheral devices, or the carrying in and out position of the material 112.

SUMMARY OF THE INVENTION

It is an object of the present invention to simplify a construction of a press brake system as a whole.

It is another object of the present invention to give degree of freedom to an industrial robot in a direction which is rectangular to a direction for carrying in of a press brake.

It is a further object of the present invention to enlarge a moving extent of an industrial robot.

It is a still further object of the present invention to increase a flexibility of the industrial robot.

To perform the objects mentioned above, an industrial robot in accordance with the present invention comprises:

a base arm having a first arm member extended in the horizontal direction, positioned at a base side portion of a robot arm:

an arm base, interconnected to the base arm, for moving the base arm in the direction of carrying a plate shaped material in and out of a pressing section of a press brake for bending;

a working arm, interconnected to a leading edge portion of the base arm, having plural second arm members and rotary axes positioned between the second arm members, wherein the rotary axes are one or more horizontal rotary axes extending in a horizontal direction and one or more vertical rotary axes extending in a vertical direction;

a holding member, provided at the leading edge portion of the working arm, for holding the material;

a releasing means for stopping the holding operation of the holding member during pressing processing for bending of the press brake to release the material; and a control means for outputting various operation commands to the robot arm.

The industrial robot, having the arrangement described above, moves the base arm to a predetermined position and operates the plural second arm members of the working arm positioned between plural rotary axes, thereby moving the holding member following the movement and operation to hold the material. The material is raised to the altitude after held by the holding member. Thereafter, the base arm is moved and more than one vertical rotary axes and horizontal rotary axes of the working arm are operated if necessary to adjust the holding state of the material to suit carrying the material in the press brake. The material is then finally carried in the press brake. Thereafter, the material is released by stopping the holding operation of the holding member provided the material is held by the press brake. For example, the material is nipped by an upper die and a lower die of the press brake. The holding member then nearly follows the material being bent by operating more than one vertical rotary axes and horizontal rotary axes following the pressing of the press brake. As a result, the holding member contacts the material with scarce delay when the pressing has finished. The material is held by the holding member while the upper die and the lower die are apart relative to one another. The material is then transported to the disposing position by moving the base arm.

Summarizing the above, the moving extent of working arm is easily enlarged because the base arm reciprocates on the arm base and the working arm operates at a predetermined position within the reciprocating extent of the base arm by operating the vertical rotary axes and the horizontal rotary axes. The holding member can be arranged at any of the symmetrical sides on the base of the base arm because the working arm operates simply by moving to and fro on the base of the base arm, the material can be carried in and out despite the disposition of the industrial robot relative to the press brake. Further, each second arm member, constituting the working arm, is determined by the minimum length required for the operation, because the base arm moves to a limit position which is the position for carrying the material in and out of the press brake and the pressing is performed around the operation of the working arm at the limit position. The mass of the working arm is accordingly decreased. Hence, the holding member is not influenced by the moment of inertia which is too much, and the holding member is remarkably raisen its followability when a driving source is controlled. On the other hand, holding of the plate shaped material by the holding member is not necessary because the material is nipped by the upper die and the lower die, thereby simplifying the robot control during the pressing processing.

Preferably, the arm base is positioned in the region not opposite the front and the side of the press brake. The front is used for carrying the plate shaped material in and out of the pressing section for bending of the press brake. In this case, operation control for carrying the plate shaped material in and out of the press brake is simplified because a space in front of the press brake is maintained as a large operation region, and the arm base is disposed so as not to be opposite the press brake. It is also preferable that the first arm member has a length so that the leading end of the first arm member is opposite to the front center portion of the press brake. In this case, the second arm members, driven by the vertical rotary axes and the horizontal rotary axes, are determined by the minimum length necessary to prevent remarkable increasing of the moving speed of the base arm for maintaining the predetermined moving speed of the plate shaped material, thereby extremely decreasing the mass of the working arm so as to remarkably improve the following of the holding member when a driving source is controlled.

It is preferable that the control means outputs the operating command to each rotary axis of the robot arm so as to move the holding member to reach the predetermined position of the bent plate shaped material when the pressing processing for bending of the press brake is finished.

It is further preferable that the holding member includes a third arm member and attracting heads provided thereto, that the attracting heads attract the material by contacting the attracting heads to the material and discharging air therefrom, that the releasing means is a forcible releasing mechanism attached to the attracting heads for releasing the plate shaped material and that the forcible releasing mechanism is driven by a releasing command from the control means.

It is further preferable that at least a base arm moving member of the arm base is constructed above a floor.

It is still further preferable that the first arm member, elongated in a horizontal direction of the base arm, is supported rotatably in a horizontal plane by intervening the vertical rotary axis. In this case, it is preferable that the arm base is positioned in the region not opposite either the front or the side of the press brake, that the front is used for carrying the material in and out of the pressing section of the press brake for bending, and that the first arm member has a length so its leading end is opposite to the front center portion of the press brake, that the control means outputs an operation command to each rotary axis of the robot arm to move the holding member to reach predetermined position of the bent material when the pressing for bending of the press brake is finished, that the holding member comprises a third arm member and attracting heads provided thereto, that the attracting heads attract the material by contacting the attracting heads to the material and discharging air therefrom, that the releasing means is a forcible releasing mechanism attached to the attracting heads for releasing the plate shaped material, and that the forcible releasing mechanism is driven by a releasing command from the control means.

It is preferable that a support base for supporting the material is provided with the press brake, that the support base includes a plural support arms and a rotary mechanism for rotating the support arms in a horizontal plane, and that the distance between the support arms is not narrower than the holding member. In this case, it is further preferable that the support base is provided at position not higher than an upper die of the press brake, and that each support arm has attracting heads for fixing the material.

It is also preferable that the first arm member, elongated in a horizontal direction of the base arm, is supported rotatably in a horizontal plane by intervening a vertical rotary axis, and that one or more press brakes are further disposed.

To perform the objects mentioned above, a method for bending plate shaped material comprises the following steps:

(a) holding a plate shaped material with a holding member, (b) transporting the material thus held toward a press brake by moving a base arm, (c) carrying the material in the press brake by cooperating the base arm and a working arm, (d) releasing the plate shaped material by stopping holding operation of the holding member, (e) bending the material with the press brake, (f) moving the holding member to bending finishing position of the material, and (g) holding the bent material with the holding member and carrying the held material out of the press brake.

The following steps are preferably included;

(h) temporarily supporting the material carried out the press brake with a support base provided at the side for carrying in and out of the press brake, and (i) holding the supported material with the holding member.

The next step is also preferably included:

(j) contacting the holding member to the material evading holes formed therein by rotating a first arm member, elongated in a horizontal plane, about an intervening vertical rotary axis.

The next step is further preferably included:

(k) moving the holding member to a waiting region, which is a non-operating region of the robot arm, by rotating a first arm member, elongated in a horizontal plane, about an intervening vertical rotary axis, before step (a) is started or after step (g) is finished.

It is preferable that plural press brakes are disposed and that the next step is included:

(m) moving the holding member for performing pressing processing for bending with any one of the press brakes by rotating a first arm member, elongated in horizontal plane, about an intervening vertical rotary axis.

BRIEF DESCRIPTION OF THE DRAWINGS

FIG. 8 is a perspective view showing a third embodiment of an industrial robot according to the present invention;

FIG. 9 is a diagram useful in understanding degree of freedom of an industrial robot in a width direction of a press brake;

FIG. 10 is a plan view schematically showing a press brake system for performing pressing with two press brake;

FIG. 11 is a schematic perspective view showing a fourth embodiment of an industrial robot according to the present invention;

DETAILED DESCRIPTION OF THE PREFERRED EMBODIMENTS

Figure 1:
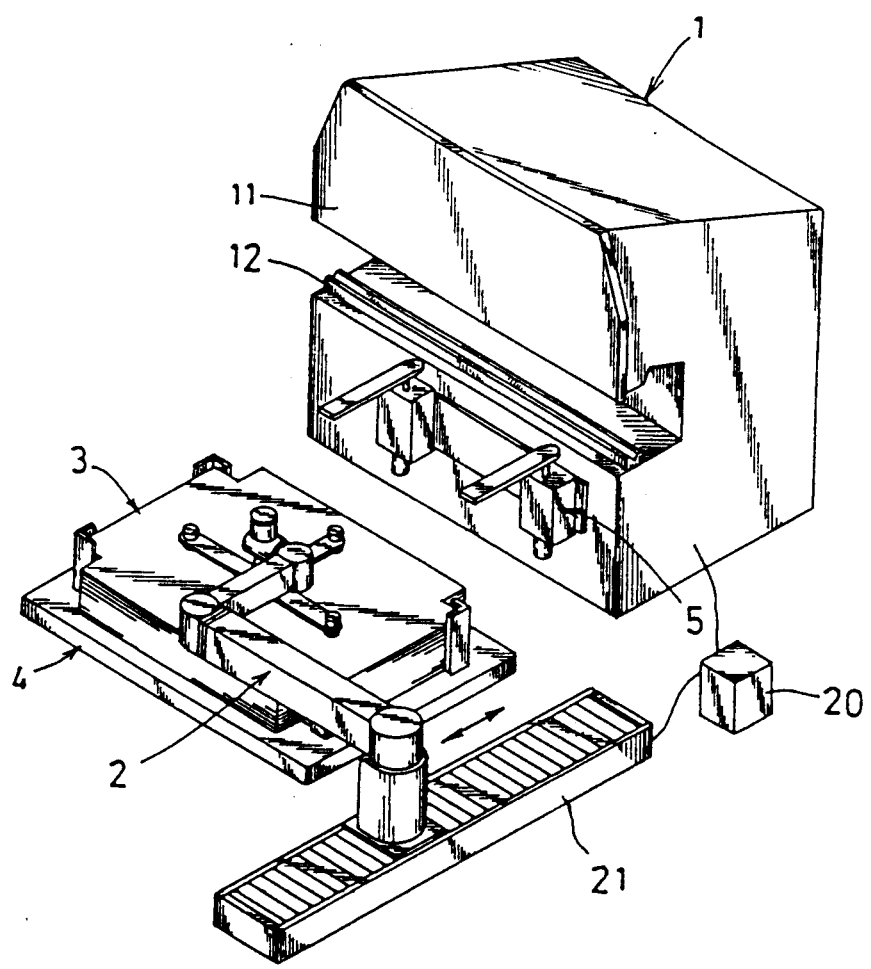
FIG. 1 is a schematic perspective view showing a press brake system incorporating an industrial robot according to a first embodiment of the present invention.

FIG. 1 is a schematic perspective view showing an industrial robot according to the present invention and a press brake.

Figure 3:
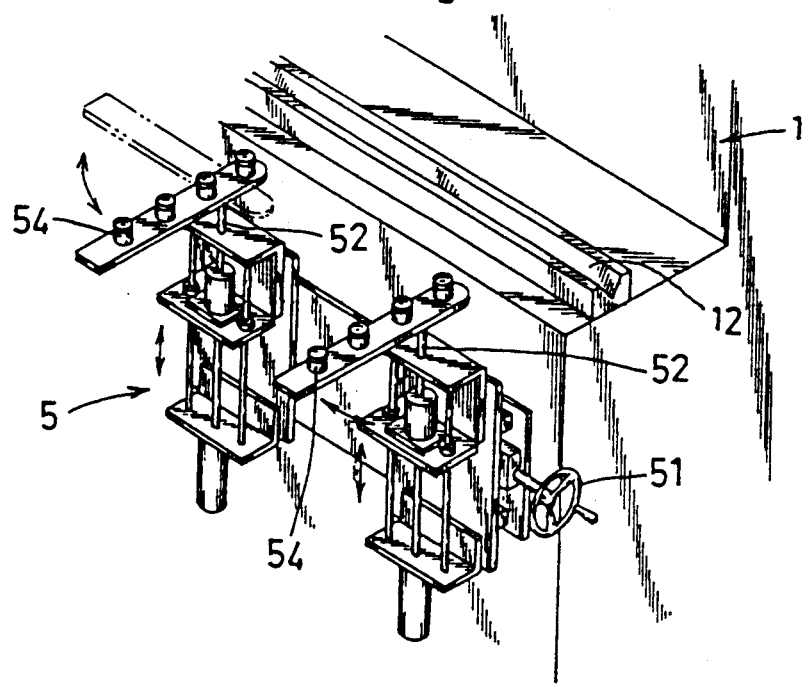
FIG. 3 is a schematic perspective view showing a support base of a press brake.
Figure 5A:
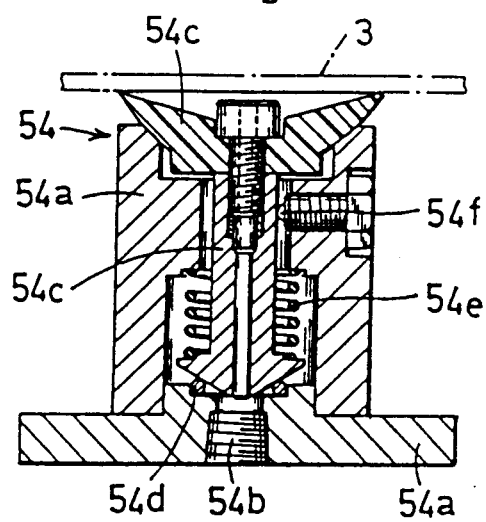
FIGS. 5(A) and 5(B) are schematic vertical section views showing an attracting head of a support base.
Figure 5B:
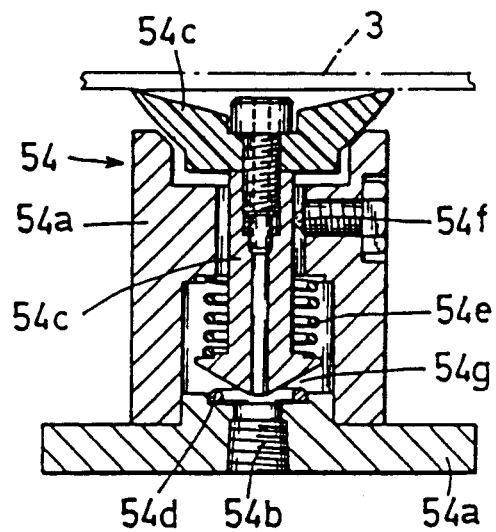

In FIG. 1, an industrial robot 2 is disposed relative to a press brake 1. The robot has an arm base 21 that is positioned substantially in a plane defined by a lower portion of a press brake 1 but not opposite to either a front face or a side face of a lower portion of the press brake I. The press brake 1 has an upper die 11, a lower die 12, and a support base 5 for temporarily supporting in an attracting manner, a plate shaped material 3 to be carried in the press brake 1. The support base 5 preferably includes a manipulating handle 51, axes 52 and attracting heads 54 having an arrangement to automatically destruct the vacuum, as shown in FIG. 3. The manipulating handle 51 is used to adjust location of the support base 5 in the width direction of the press brake 1, and the axes 52 are used to rotate the support base 5 for selecting a restored condition positioning the support base 5 along the front face of the press brake 1. The attracting head 54 is also shown in FIGS. 5(A) and 5(B), and includes a body 54a having an air outlet 54b, an attracting pad 54c reciprocally mounted in the body 54a, a sealing member 54d for securing contact of the attracting pad 54c to the air outlet portion of the body 54a and preventing leakage of air, a spring member 54e for forcibly contacting the attracting pad 54c to the sealing member 54d, and plungers 54f for regulating posture of the attracting pad 54c. The air outlet 54b runs into a vacuum generator or the like (not shown). A robot controller 20 is provided as a control means. The press brake 1 also has a back gauge (not shown) for regulating a margin for bending and for adjusting the margin based on the input value from outward.

Figure 2:
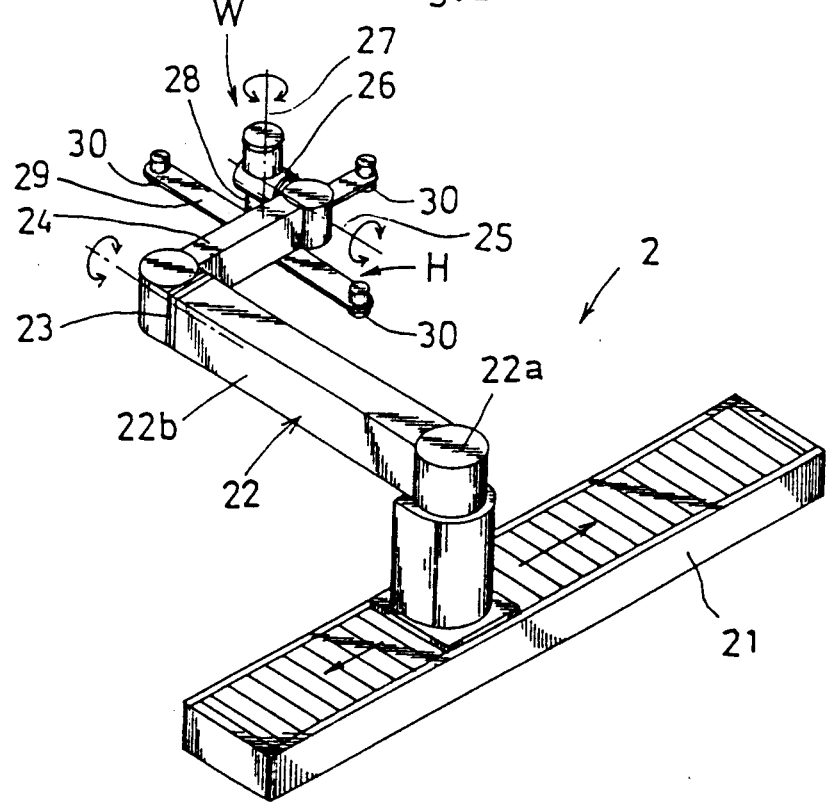
FIG. 2, is a perspective view showing a first embodiment of an industrial robot according to the present invention.

FIG. 2 is a perspective view of a first embodiment of an industrial robot according to the present invention.

The industrial robot 2 has an arm base 21 having a predetermined length, a base arm 22 reciprocally movably supported to the arm base 21, a working arm W provided along the leading edge portion of the base arm 22 opposite to the arm base side portion, and a holding member H for holding a plate shaped material 3, provided along the leading edge portion of the working arm W.

The base arm 22 is provided with the base side portion of a robot arm. The base arm 22 has a vertically standing member 22a reciprocally moved by a reciprocating axis (not shown) provided in the arm base 21, and a first arm member 22b, extending in a horizontal direction, provided with the leading edge portion of the vertically standing member 22a. The first arm member 22b has a length extending from opposite its leading edge portion to the front center portion of the press brake.

The working arm W has three second arm members 24, 26 and 28, rotary axes 25 and 27 intervened between the second arm members, and rotary axis 23 intervened between the second arm member 24 and the first arm member 22b. The rotary axes 23 and 25 are horizontal rotary axes extending in a horizontal direction, while the rotary axis 27 is a vertical rotary axis extending in a vertical direction. The second arm member 24 extends to a direction which is rectangular to the horizontal rotary axis 23, while the second arm members 26 and 28 extend to a direction of rotary axes 25 and 27 respectively. The second arm member 24 is accordingly rotated in a vertical plane by the horizontal rotary axis 23, while the second arm members 26 and 28 are turned on their axes by the rotary axes 25 and 27, respectively. The second arm members 24, 26 and 28 have a length corresponding to the minimum length necessary to suppress remarkable increase of moving speed of the base arm 22. The moving speed is necessary for maintaining the predetermined moving speed of the plate shaped material 3 when the material 3 is being bent.

The holding member H has a holding member body 29 provided with the leading edge portion of the second arm member 28 and plural attracting heads 30 provided with the leading edge portion of the holding member body 29.

The robot controller 20 outputs various necessary operation commands to the industrial robot 2 and the press brake 1.

Operations of the press brake system described above are as follows.

Figure 6:
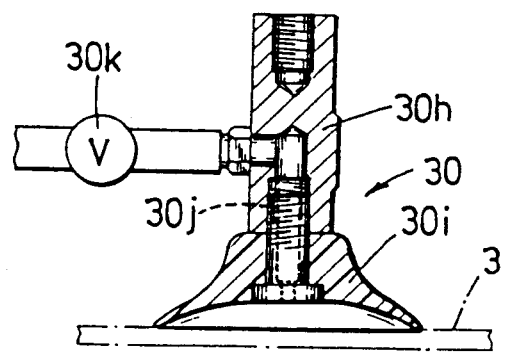
FIG. 6 is a schematic perspective view showing an attracting head of a holding member.

Plural plate shaped material 3 are piled on a material support base 4 which is opposite to the front of the press brake 1 and separated from the press brake by a predetermined distance In this condition, the base arm 22 is moved to a position opposite the material support base 4 by the reciprocating axis (not shown), and the rotary axes 23, 26 and 27 are operated to contact plural attracting heads 30 of the holding member H with the uppermost plate shaped material 3. The material 3 is then attracted by the attracting heads 30 (see FIG. 4(A)). Attracting the material 3 is performed by contacting the attracting heads 30 with the material 3 and discharging air therefrom to generate a negative pressure by a vacuum generator (not shown) or the like (see FIG. 6,) which runs into the attracting heads 30 through a valve 30k or the like as a releasing means. Then the uppermost material 3 is lifted up by operating each rotary axes 23, 25 and 27 in a reverse direction. The material 3, thus lifted up, is carried in the press brake 1 to position the bending portion of the material 3 between the upper die 11 and the lower die 12 (see FIG. 4(B)), by moving the base arm 22 by the reciprocating axis toward the press brake 1 and operating each rotary axis, if necessary, to change the posture of the material 3. The material 3 is further moved to contact with the back gauge (not shown). The material 3 is then supported on the support base 5 by attracting the material 3 with the attracting heads 54 of the support base 5. Thereafter, the material 3 is released from the holding member H by stopping the attracting operation with the attracting heads 30.

The accurately positioned material 3 is now attracted and supported by the support base 5 which is raised to the altitude equal to the top surface of the lower die 12. The holding member H is moved to the position below the material 3 and reversed to position the attracting heads 30 upward by moving the base arm 22 and operating each rotary axis, thereby allowing the movement of the material 3 following the pressing (see FIG. 4(C)).

When the holding member H has changed its position and reversed its top and bottom, the material 3 may be attracted by the attracting heads 30.

When the material 3 is bent by coming down the upper die 11, attracting of the material 3 with the attracting heads 30 is stopped just before nipping the material 3 with the upper die 11 and the lower die 12. And when the pressing is started, the material 3 is no longer attracted by the attracting heads 54 of the support base 5. The releasing of the material 3 is performed through forming clearance 54g between the sealing member 54d and the attracting pad 54c as shown in FIG. 5(B). The clearance 54g is formed by slightly moving the material 3, more particularly when the material 3 is started bending by nipped with the upper die 11 and the lower die 12, the attracting pad 54c follows the material 3, while the body 54a remains as it is because the material 3 is attracted with the attracting head 54, resulting the movement of the attracting pad 54c against the spring member 54e to form the clearance 54g. The bending angle of the material is accordingly determined accurately by controlling the coming down distance of the upper die 11. Also, when the bending operation described above is carried out, the holding member H nearly follows the attracting position of the material 3, (see FIG. 4(D)) which goes up at high speed following the bending operation, by controlling the operation of the reciprocating axis and the rotary axes 23 and 25. The followability of the holding member H may not be so high because the attracting of the material 3 is stopped. But the holding member H highly follows the material 3 because the mass of the leading edge portion than the horizontal rotary axis 23 is small enough. Accordingly, attracting the material 3 with the attracting heads 30 is performed with scarce delay time after bending the material 3 is finished. Afterward, the material 3 is securely held by the holding member H even when the upper die 11 goes up (see FIG. 4(E)), thereby preventing the material 3 from dropping. Thereafter, the material 3 is moved to a position not shown by moving the reciprocating axis of the base arm 22 and operating each rotary axis. The material 3 is then piled by stopping the attracting operation with the attracting heads 30.

When the material 3 is required to be bent more than twice and in the same directions, the material 3 is charged in direction by operating each rotary axis of the working arm W, and is then carried in the press brake i. The second bending and so on is then performed as the first bending described earlier.

Figure 4:
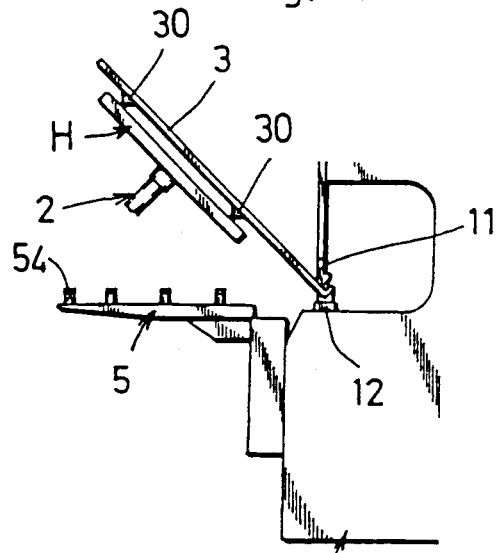
FIGS. 4(A) to 4(G) are schematic side views explaining a bending operation for a plate shaped material.
Figure 4:
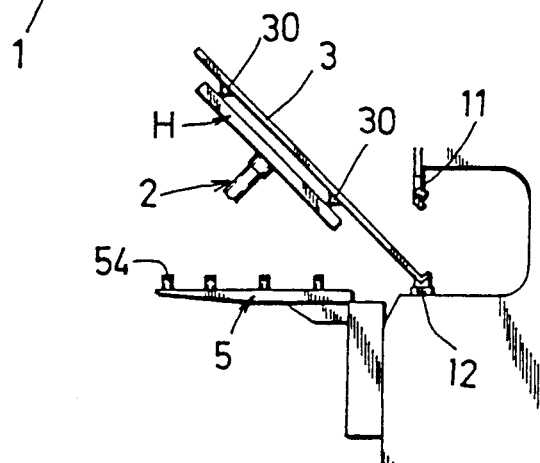
Figure 4:
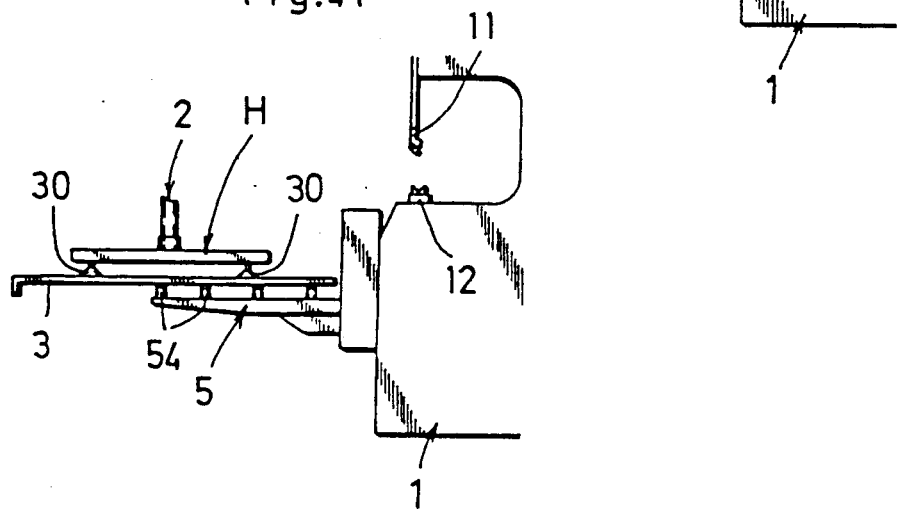
Figure 4G:
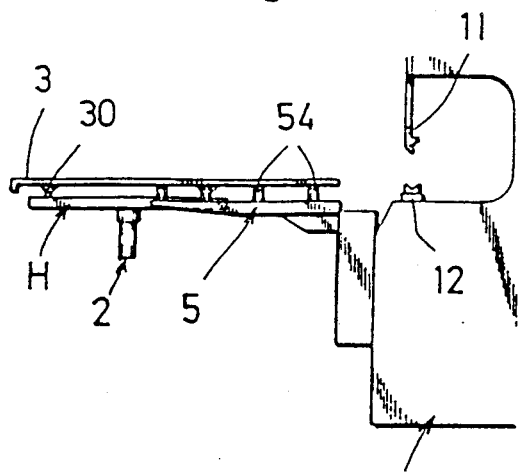

On the contrary, when the material is to be bent a second time in the reverse direction to the first bending direction, the material 3, held by the holding member H, is moved to the support base 5 and supported by the support base 5 (see FIG. 4(F)). The attracting heads 30 then contact to the bottom of the material 3 by operating each rotary axis of the working arm W, thereby attracting the material 3 (see FIG. 4(G) ). Thereafter, the top and the bottom of the material 3 is reversed by operating each rotary axis of the working arm W and the material 3 is moved to the top surface of the lower die 12. Thereafter, the bending operation for the second time in the reverse direction is performed in the same manner as the bending operation for the first time described earlier. The bent material 3 is carried out of the press brake 1 and piled at the predetermined position by moving the base arm 22 and operating the working arm W. The bent material 3 may be uniformly piled. When the bent material 3 needs to be piled at a lower height, every other material 3 should be piled with its top and bottom in a reversed state through supporting the material 3 by the support base 5 and reversing the attracting surface of the material 3 by operating each rotary axis of the working arm W. On the contrary, when reversing attracting surface of the material 3 is not required, the support base 5 is rotated around the axes 52 to the position along the front of the press brake, thereby extremely widening the space for operating the holding member H.

As is apparent from the foregoing, though reciprocating distance of the base arm 22 is determined on the basis of the length of the arm base 21, a flatcar for transporting the material may be employed as a support base 4 by designing the arm base 21 to have enough length, and stopping position of the flatcar may flexibly be determined.

It is preferable that dispositions of the press brake 1 and the support base 4 on the basis of the industrial robot 2 are reversed. In this case, the material 3 is smoothly carried in, bent, and carried out in the same manner as above, when the press brake 1 and the support base 4 are positioned at an interval which corresponds to the reciprocating distance of the base arm 22.

SECOND EMBODIMENT

Figure 7:
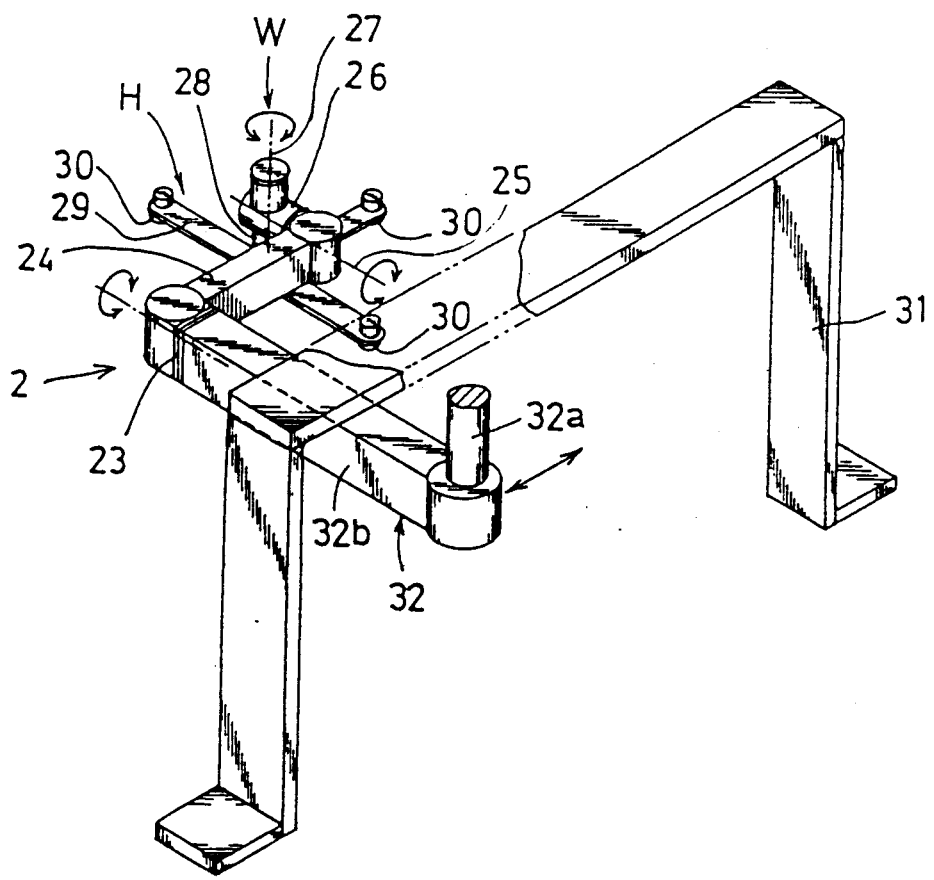
FIG. 7 is a schematic perspective view showing a second embodiment of an industrial robot according to the present invention.

FIG. 7 is a schematic perspective view of a second embodiment of an industrial robot according to the present invention.

The difference from the first embodiment is that a base arm 32 reciprocally hands down from an arm base 31, instead of the base arm 22 reciprocally standing on the arm base 21. Further, the base arm 32 has a vertical hanging member 32a and a first arm member 32b. Arrangement of the other part is the same as the first embodiment.

In this embodiment, availability of the space above the floor is improved because the arm base 31 exists above the floor. This embodiment performs the same operations as the first embodiment.

In both embodiments, the lower die 12 may be moved up and down instead of the upper die 11 being moved up and down.

THIRD EMBODIMENT

FIG. 8 is a perspective view of a third embodiment of an industrial robot according to the present invention.

The difference from the first embodiment is that the base arm 22 includes a vertical standing member 22a reciprocal with the arm base 21, a first arm member 22b, extending in a horizontal direction, provided with the leading edge portion of the vertical standing member 22a, and a vertical rotary axis 22c extending in a vertical direction intervened between the vertical standing member 22a and the first arm member 22b. Arrangement of the other part is the same as the first embodiment.

In this embodiment, degree of freedom for controlling the posture of the plate shaped material 3 is increased because the first arm member 22b can be rotated in a horizontal plane. More particularly, when the industrial robot 2 is not required in operation, the working arm W and the holding member H are positioned directly over the arm base 21 as a whole (refer to dot-chain line in FIG. 9) by rotating only the first arm member 22b. thereby making free front space of the press brake 1. As a result, operability is improved when the die is exchanged, manual operation is carried out and so on. Further, for example, when the plate shaped material 3 has a hole 3a at the center portion thereof and secure attracting may not achieved because of the opposition of the attracting heads 30 to the hole 3a, the holding member H is moved in a width direction of the press brake 1 through rotating the first arm member 22b by operating the vertical rotary axis 22c, and moving the base arm 22 by operating the reciprocal moving axis corresponding to the rotation angle of the first arm member 22b (refer to two dot-dash line in FIG. 8), thereby accomplishing the secure holding of the material with the holding member H.

FIG. 10 is a plan view schematically showing a press brake system for performing pressing with two press brakes.

Two press brakes 1 and 1a are separated by a predetermined distance in their width direction. The industrial robot 2, having the arrangement shown in FIG. 7 is disposed at the intermediate position of the press brakes 1 and 1a. A carrying material in line 6 extends to opposite the front predetermined position of the press brake 1, and a carrying material out line 7 extends to opposite the front predetermined position of the press brake 1a. The press brakes 1 and 1a have dies, which are different to each other.

In this press brake system, having the arrangement described above, the material 3 is carried in the press brake 1 by the industrial robot 2. The material 3 sequentially supplied through the carrying material in line 6, and pressing is performed by the press brake 1. After the pressing is finished, the pressed material 3 is carried in the press brake 1a through rotating the first arm member 22b by approximately 180 degrees by operating the vertical rotary axis 22c of the industrial robot 2 and by operating rotary axes of the working arm W. Pressing is performed by the press brake 1a. The material 3 thus pressed by both press brakes 1 and 1a is transported to the carrying material out line 7 by the industrial robot 2.

Thereafter, plural material 3 are pressed by two press brakes by repeating the series of operations described above, and the number of the industrial robot can be decreased for the press brake. The construction of an automated line for performing a plurality of pressing by plural press brakes can be extremely simplified.

When operation of the industrial robot 2 is not required, the working arm W and the holding member H are positioned directly over the arm base 21 as a whole (refer to dot-chain line in FIG. 10) by rotating only the vertical rotary axis 22c, thereby making free front space of the press brakes 1 and 1a. As a result, operability is improved when the die is exchanged, manual operation is carried out, and so on.

It is preferable that another press brake is disposed opposite one of the press brakes 1 and 1a, and that the material 3 is moved between three press brakes by one industrial robot 2.

FOURTH EMBODIMENT

FIG. 11 is a schematic view of a fourth embodiment of an industrial robot according to the present invention.

The difference from the third embodiment is that a base arm 32 reciprocally hangs down from an arm base 41 instead of the base arm 22 reciprocally standing on the arm base 21. Further, the base arm 42 has a vertical hanging member 42a, a first arm member 42b, and vertical rotary axis 42c. Arrangement of the other part is the same as the first embodiment.

In this embodiment, availability of the space above the floor is improved because the arm base 41 exists above the floor. Also, this embodiment performs the same operations as the third embodiment.

FIFTH EMBODIMENT

Figure 12:
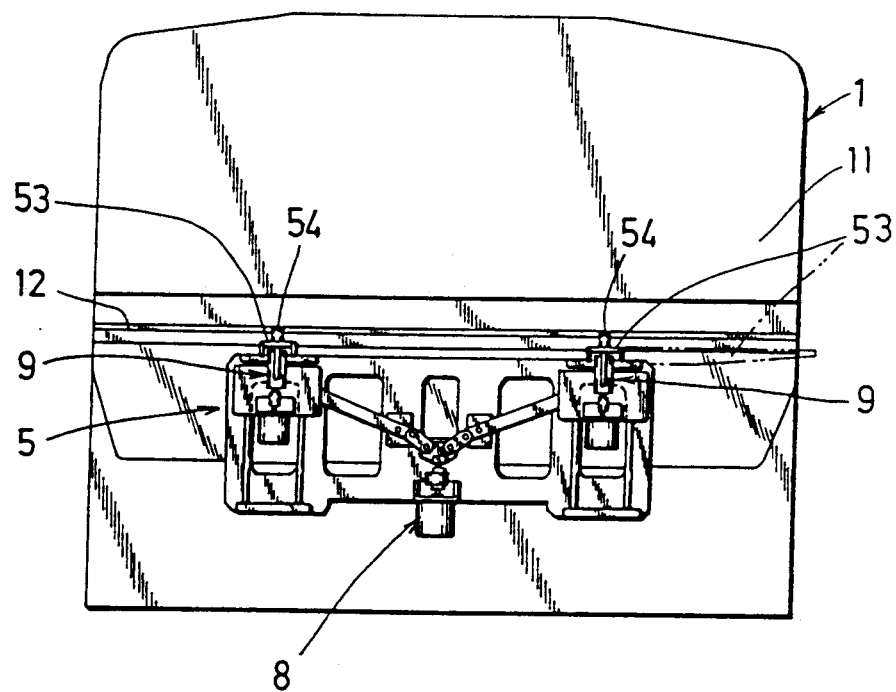
FIG. 12 is a schematic front view showing a support base provided with a press brake.
Figure 13:
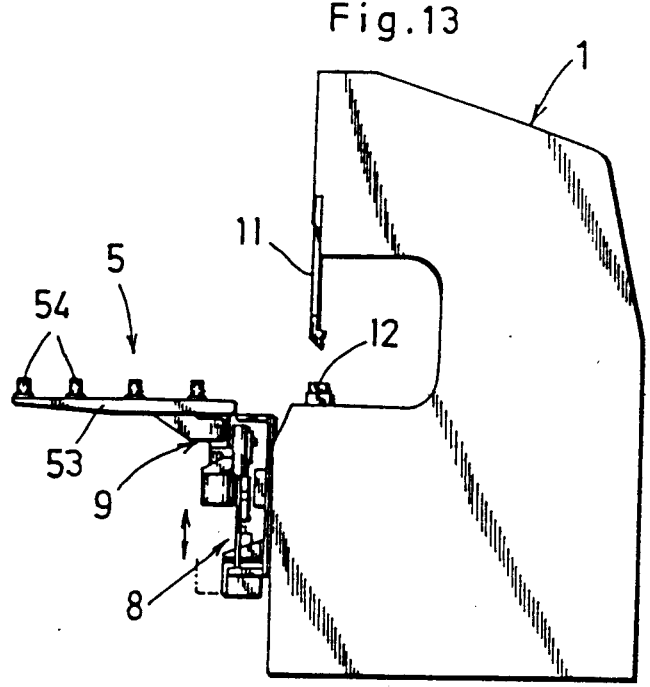
FIG. 13 is a side view of the same.

FIG. 12 is a schematic front view of a fifth embodiment of a support base according to the present invention, while FIG. 13 is a side view of the same.

A support base 5 is provided at the front predetermined position of the press brake 1 which has a lower die 12 fixed at the predetermined position thereof and an upper die 11 movable upward and downward. The support base 5 includes a pair of support arms 53 connected to the press brake 1 with an intervening elevating mechanism 8 and a rotating mechanism 9. It is preferred that the support base 5 includes more than three support arms 53.

Figure 14:
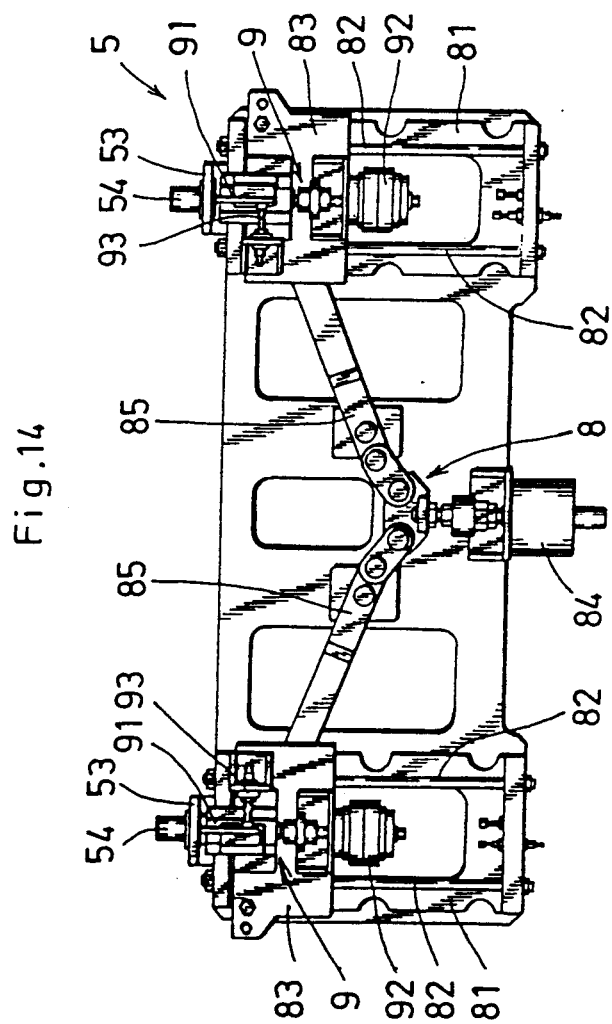
FIG. 14 is an enlarged front view showing a support base.
Figure 15:
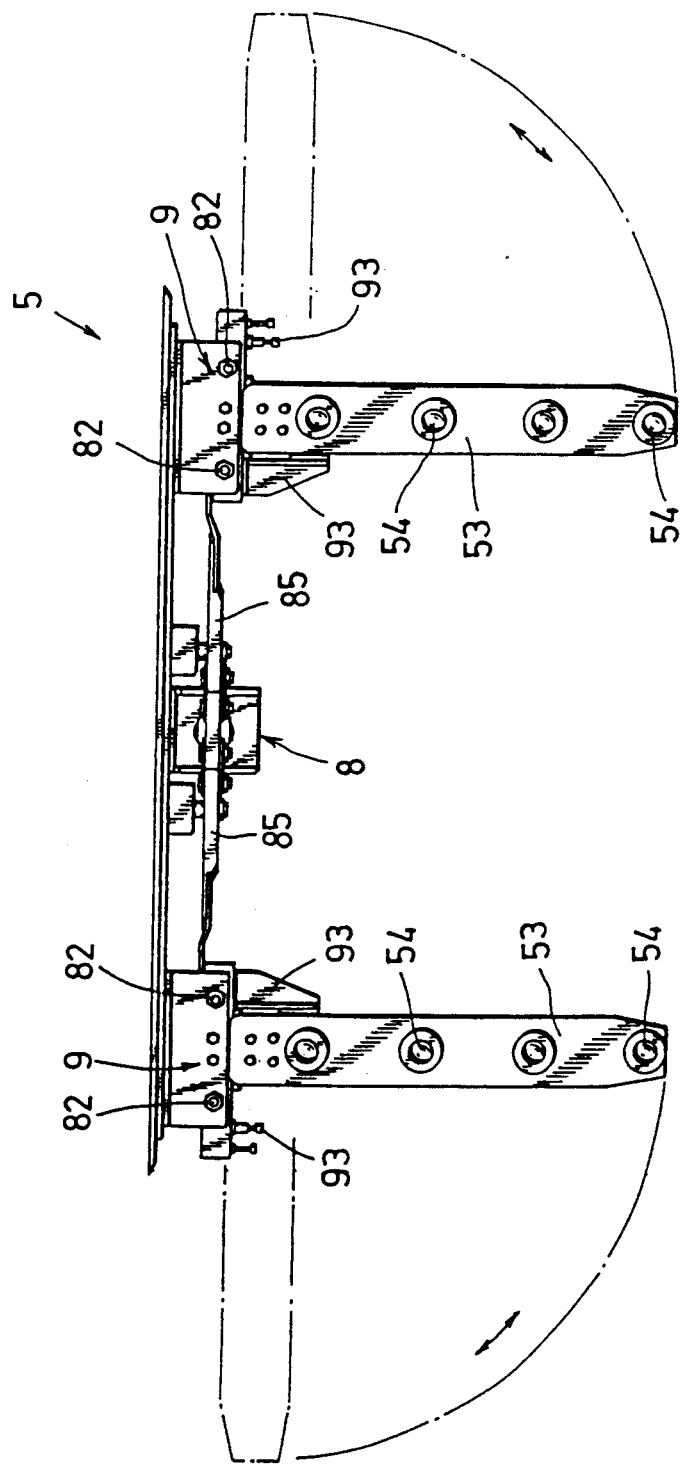
FIG. 15 is an enlarged plan view of the same.
Figure 16:
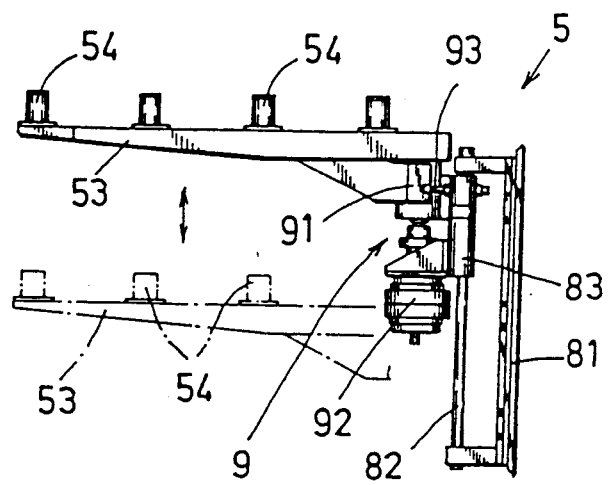
FIG. 16 is an enlarged side view of the same.
Figure 17:
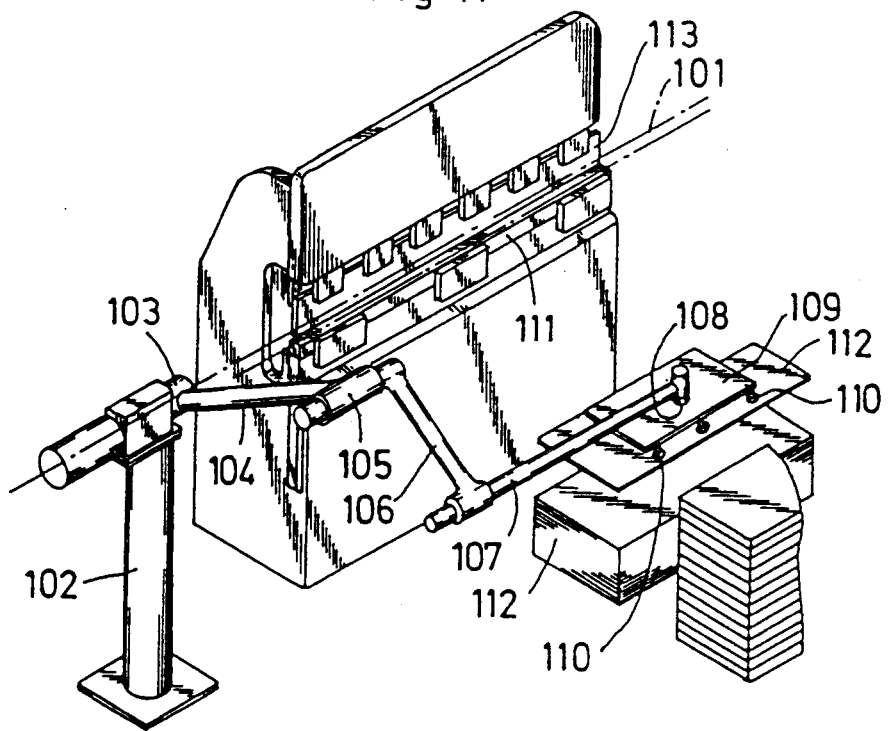
FIG. 17 is a schematic perspective view showing a conventional press brake system incorporating an industrial robot.

More particularly, referring now to FIGS. 14 to 16, the elevating mechanism 8 includes: a pair of frames 81 fixed to the front face of the press brake 1, guide shafts 82 supported by the frame 81, movable frames 83 movably engaged upward and downward with the guide shaft 82, a cylinder device 84 fixed to the predetermined position of the press brake 1, and link members 85 for interconnecting a piston rod of the cylinder device 84 and each movable frame 83. Thereby, both moving frames 83 can move upward and downward simultaneously following the operation of the cylinder device 84. The rotating mechanism 9 includes: rotary support members 91 for rotatably supporting the base portion of the support arms 53, driving sources 92 for supplying rotary force to the support arms 53, and rotation limiting members 93 for regulating a rotary limit of the support arms 53. Thereby, the support arms 53 can move between two limit positions by driving the driving sources 92. One limit position lays the support arms 53 along the front surface of the press brake 1, while the other limit position rectangularly projects the support arms 53 from the front surface of the press brake 1. Both driving sources 92 are synchronized to be driven the same quantity in opposite directions to one another. Further, the support arms 53 have a length for stably supporting thereon the maximum sized plate shaped material 3 to be bent, and have plural attracting heads 54 at every predetermined interval. The attracting heads 54 have a predetermined height to form a space between the top surface of the supporting arm 53 and the attracting surface of the attracting heads 54. This space is sufficient for housing the edge portion of the material 3 already bent.

In this embodiment, the same operation as shown in FIGS. 4(A) to 4(G) is performed. Also, the support arm 53 can be lowered through rotating the link members 85 by projecting the piston rod of the cylinder device 84, and lowering both movable frames 83 along the guide shafts 82, thereby eliminating interference of the material 3 with each axis. On the contrary, the support arm 53 can be lifted through rotating the link members 85 in a reverse direction by pulling in the piston rod of the cylinder device 84, and lifting both movable frames 83 along the guide shafts 82, thereby maintaining sufficient space for holding the material 3 with the holding member H.

What is claimed is:

1. An industrial robot for carrying plate shaped material in and out of a press brake which has a lower portion and which presses and bends said material, said robot comprising:
   arm members including:
   a base arm member positioned at a base side portion of said arm members;
   a first arm member extending in a horizontal direction from said base arm member; and
   plural second arm members, interconnected to said first arm member, and having rotatable members between said second arm members, at least one of said rotatable members being rotatable about a horizontal axis and another of said rotatable members being rotatable about a vertical axis;
   an arm base, interconnected to said base arm member, for moving said base arm members reciprocally between a pressing section of said press brake and a piled portion of said material, said arm base being positioned substantially in a plane defined by said lower portion of said press brake and being outside of a region that is opposite a front portion and a side portion of said lower portion of said press brake, plate shaped material being carried in and out of said pressing section of said press brake at said front portion thereof;

a holding member, provided at a leading edge portion of said second arm member, for holding said material;

a releasing means for releasing material being held by said holding member during pressing for bending by said press brake; and a control means for outputting operation commands to said arm base members, said arm base, said holding member and said releasing means.

2. An industrial robot as set forth in claim 1, wherein said first arm member has a length sufficient to position its leading end opposite a center of said front portion of said press brake.

3. An industrial robot as set forth in claim 1, wherein said control means outputs an operation command to each rotatable member of said second arm members to move said holding member to a predetermined position with respect to material bent by said press brake.

4. An industrial robot as set forth in claim 1, wherein said holding member includes a third arm member and attracting heads provided on said third arm member, said attracting heads attracting said material by contacting said material and discharging air, said releasing means being a forcible releasing mechanism attached to said attracting heads for releasing said material, said forcible releasing mechanism being driven by a releasing command from said control means.

5. An industrial robot as set forth in claim 1, wherein said arm base has a base arm moving member positioned above a floor.

6. An industrial robot as set forth in claim 1, wherein said base arm further includes a rotatable member which is rotatable about a vertical rotary axis, said first arm member being rotatably supported in a horizontal plane by intervening said rotatable member.

7. A pressing system for plate shaped material, said pressing system comprising:

a press brake for performing pressing for bending said material; and an industrial robot for carrying said material in and out of said press brake;

said industrial robot including:

arm members operational for carrying said material, said arm members comprising a base arm member positioned at a base side portion of said arm members, a first arm member extending in a horizontal direction from said base arm member, and plural second arm members, interconnected to said first arm member, and having rotatable members being rotatable about a horizontal axis and another of said rotatable members being rotatable about a vertical axis;

an arm base, interconnected to said base arm member, for moving said base arm member reciprocally between a pressing section of said press brake and a piled portion of said material, said arm base being positioned outside of a region that is opposite a front portion and a side portion of said press brake, material being carried in and out of said pressing section of said press brake at said front portion thereof;

a holding member, provided at a leading edge portion of said second arm members, for holding said material;

a releasing means for releasing material held by said holding member during pressing for bending by said press brake; and a control means for outputting operation commands to said arm members, said arm base, said holding member and said releasing means.

8. A pressing system as set forth in claim 7, further comprising:

a support base, provided with said press brake, for supporting said material;

said support base including;

plural support arms for supporting said material; and a rotating mechanism for rotating said support arms in a horizontal plane, wherein distance between said support arms is no narrower than said holding member.

9. A pressing system as set forth in claim 8, wherein said support base is positioned no higher than an upper die of said press brake, and said support arm further has attracting heads for fixing said material.

10. A pressing system as set forth in claim 7, wherein said base arm further includes a rotatable member which is rotatable about a vertical axis, said first arm member being rotatably supported in a horizontal plane by intervening said rotatable member, and one or more press brakes are further disposed.

11. A method for pressing a plate shaped material by using a press brake for pressing said material for bending, and an industrial robot, having arm members with a vertical base arm formed at a base portion thereof and working arms connected to said base arm, for carrying said material in and out of said press brake, said method comprising the steps of:

(a) acquiring material with a holding member;

(b) transporting held material toward said press brake by moving said base arm along a path that is substantially in a plane defined by a lower portion of said press brake and is outside of a region that is opposite a front portion and a side portion of said press brake;

(c) carrying held material into said press brake by said base arm and said working arms;

(d) releasing held material by stopping said holding member from holding said material;

(e) bending said material with said press brake;

(f) moving said holding member to the bent portion of said material whereby said holding member follows a bending velocity of said material; and (g) holding said material bent by said press brake with said holding member and carrying said material out of said press brake.

12. A method as set forth in claim 11, further comprising the steps of:

(h) temporarily supporting said material carried out of said press brake with a support base provided at a front portion of said press brake for carrying in and out of said press brake; and (i) holding said supported material with said holding member.

13. A method as set forth in claim 11, further comprising a step of:

(j) contracting said holding member with said material so as to evade holes in said material by rotating said working arms about said base arm when said material has holes in its predetermined position.

14. A method as set forth in claim 11, further comprising a step of:

(k) moving said holding member to a waiting region, which is a non-operating region of said working arms, by rotating said working arms about said base arm before step (a) is started or after step (g) is finished.

15. A method as set forth in claim 11, wherein one or more press brakes are further included for performing different types of pressing, and further comprising a step of:
(m) moving said holding member for performing pressing processing for bending with any one of said press brakes by rotating said working arms about said base arm.

16. An industrial robot for carrying plate shaped material in and out of a press brake which presses and bends said material, said robot comprising:
arm members including:
a base arm member positioned at a base side portion of said arm members;
a first arm member extending in a horizontal direction from said base arm member and having a length sufficient to position a leading edge portion thereof opposite a front center portion of said press brake; and
plural second arm members, interconnected to said first arm member, and having rotatable members between said second arm members, at least one of said rotatable members being rotatable about a horizontal axis and another of said rotatable members being rotatable about a vertical axis;
an arm base, interconnected to said base arm member, for moving said base arm member reciprocally between a pressing section of said press brake and a piled portion of said material, said arm base being substantially in a plane defined by said lower portion of said press brake and being positioned outside of a region opposite a front portion and a side portion of said press brake, plate shaped material being carried in and out of said pressing section of said press brake at said front portion thereof;
a holding member, provided at a leading edge portion of said second arm members, for holding said material, said holding member including a third arm member and attracting heads provided on said third arm member, said attracting heads attracting said material by contacting said material and discharging air;
a releasing means for releasing material held by said holding member during pressing for bending by said press brake, said releasing means being a forcible releasing mechanism attached to said attracting heads; and
control means for outputting operation commands to each of said rotatable members to move said holding member to a predetermined position with respect to material that has been bent by said press brake.

* * * * *